United States Patent [19]
Wright et al.

[11] 3,917,541
[45] Nov. 4, 1975

[54] HYDROCARBON CONVERSION CATALYSTS AND PRECURSORS THEREOF

[75] Inventors: Alan C. Wright; Hsien-Dao Chang, both of Houston, Tex.

[73] Assignee: N L Industries, Inc., New York, N.Y.

[22] Filed: Jan. 7, 1974

[21] Appl. No.: 431,028

[52] U.S. Cl............ 252/441; 252/442; 252/455 R; 252/457; 252/458; 252/459; 208/110; 208/111; 208/115
[51] Int. Cl.² .................................. B01J 27/12
[58] Field of Search........ 252/441, 455 R, 458, 459, 252/457, 454, 442

[56] References Cited
UNITED STATES PATENTS 3,642,661  2/1972  Jolley et al................ 252/455 R X
3,652,457  3/1972  Jaffe ....................... 252/442

*Primary Examiner*—Patrick P. Garvin
*Attorney, Agent, or Firm*—Delmar H. Larsen; Roy F. House; Robert L. Lehman

[57]  ABSTRACT

Catalysts of wide utility, e.g., for hydrocarbon conversion, are prepared by calcining at 500°C. to 800°C. a septechlorite precursor prepared by hydrothermal synthesis, and which may be characterized as a charge-balanced 1:1 trioctahedral phyllosilicate in which the divalent metal ions may be nickel, magnesium, cobalt, iron, copper, manganese, zinc, or mixtures thereof, and the trivalent metal ions may be aluminum, chromium, iron, or mixtures thereof, in relative proportions as set forth in the specification and claims.

8 Claims, No Drawings

HYDROCARBON CONVERSION CATALYSTS AND PRECURSORS THEREOF

This invention relates to novel catalysts and the precursors thereof, having wide applicability as catalysts and particularly useful in the field of hydrocarbon conversion. More particularly, it discloses new catalysts comprising nickel, cobalt, iron, zinc, manganese, copper, or magnesium, and mixtures thereof, together with silicon and aluminum or chromium and mixtures thereof, all in a precursor structure as well as in the finished catalysts, as more specifically described hereinbelow.

The catalytic activity for various reactions of the several heavy metals mentioned above has been known for many decades. In order to have catalytic activity, however, the atoms of the metal or metals chosen must be available to the reactants, and moreover in such fashion that they are in effect fixed to a substrate having a vast specific surface. The substrate itself is by no means indifferent, but tends to establish a conditioning environment for the catalytic metal atoms, with more or less great influence thereon.

An object of the present invention is to provide novel catalysts made from precursors thereof, which enable the catalytic activity of the metals present to be greatly enhanced over their activity when present in prior art carriers; and to provide processes for synthesizing the said precursors.

Other objects of the invention will appear as the description thereof proceeds.

Generally speaking, and in accordance with illustrative embodiments of our invention, we prepare by hydrothermal means a precursor phyllosilicate containing the selected metal or metals, and synthesized in such a fashion that it is a septechlorite. This will be explained in detail below. Having prepared the septechlorite, which upon investigation by x-ray diffraction will be found to possess a more or less well-defined crystalline structure, and which constitutes the precursor of our invention, we then heat it to within the range of about 500°C. to about 800°C., with a preferred optimum of about 650° C., whereupon the crystallinity is destroyed and the thus-calcined product is amorphous upon x-ray diffraction. The temperature should not be so low that the change from crystal to amorphous fails to take place; and on the other hand, it should not be so high that the product fuses.

Coming now to the septechlorite precursor of the invention it may be mentioned that septechlorites are phyllosilicates, that is, silicates with a laminar habit, exhibiting a basal spacing of approximately 7 A. In that respect they differ from the true chlorites, for which the corresponding spacing is approximately 14 A. Moreover, they are silicates of the so-called 1:1 type, having one octahedral layer bonded to an adjacent tetrahedral layer by the sharing of oxygen ions. Moreover, the structure is trioctahedral, that is, all of the possible sites for positive ions in the octahedral layer are occupied, in contrast to the so-called dioctahedral structures in which only two-thirds of such sites are filled. Furthermore, each individual sheet is electrostatically neutral, with as many positive ions as negative ions within the individual layer structure. This is in contrast to electrostatically unbalanced silicates, such as zeolites and smectites, which require cations exterior to the silicate framework in order to achieve electrostatic neutrality. Those knowledgeable in clay chemistry will of course recognize that some ion-exchange capacity is generated by broken bonds at the edges of the crystallites even in balanced layers, as evidenced for example by kaolinite and attapulgite.

A good discussion of septechlorites occurs in the chapter by that name on pages 164–169 of the text "Rock-Forming Minerals", vol. 3, Sheet Silicates, by W. A. Deer et al., London, 1962. Nomenclature for this group varies somewhat; Brindley in the text, "The X-Ray Identification and Crystal Structures of Clay Minerals", G. Brown, Ed., London, 1961, pages 276–280, prefers the term "aluminian serpentine". French workers prefer "berthiérine", as described, for example, on page 187–193 of the text "Minéralogie des Argiles", by Simonne Caillére et al., Paris, 1963. The cited chapters in these three texts are hereby incorporated herein by reference.

The structure of septechlorites in general, in accordance with the foregoing description, may be more clearly understood by reference to the general formulation per formula weight which follows:

$$[M_{6-x}^{2+}, M_x^{3+}][Si_{4-x}^{4+}, M_x^{3+}]O_{10}(OH)_8 \qquad [1]$$

where $M^{2+}$ is a divalent metal ion, and
$M^{3+}$ is a trivalent metal ion, both having an ionic radius permitting them to be fitted into the lattice as described below.

In the formulation just given, the first bracket shows the cations present in the octahedral layer, that is, the layer in which each cation is surrounded by 6 oxygen, hydroxyl, or fluoride ions in the octahedral array as formed by 6 spheres in close packing; whereas the second bracket shows the cations present in the lattice in tetrahedral coordination, that is, surrounded by 4 of the aforementioned negative ions in tetrahedral array. The remainder of the constituents of the lattice is shown by the 10 oxygen ions and the 8 hydroxyl ions.

In each bracket, the second constituent shows the ions which may be considered as isomorphously substituted for a portion of the element represented by the first constituent of each bracket. It will be observed that within the first bracket the substituting ions are trivalent, and occupy positions which would otherwise be occupied by a divalent ion. In the second bracket, it will likewise be noted that the substituting ions are trivalent but in this case they substitute for elements which are tetravalent. It will further be noted that the degree of such isomorphous substitution within the octahedral layer, i.e., the first bracket, is the same as the degree of substitution within the tetrahedral layer, i.e., the second bracket. Thus the electrostatic imbalance occasioned by the substitution within the octahedral layer is exactly counterbalanced by the electrostatic imbalance (of opposite sign) in the tetrahedral layer.

By way of example, it may be mentioned that when $M^{2+}$ is magnesium, $M^{3+}$ is aluminum, and $x$ is 2, the foregoing formulation defines the ideal formula for the mineral species known as amesite.

The foregoing description is quite general although exact. In order to present the composition of the precursor septechlorites utilized in the present invention, we find it more convenient to present a formulation in the well-known oxide form, which is to be read along with the general formulation just given as far as the distribution of the ions within the respective layers is concerned. This formulation, which again shows the components present in one formula weight of the septechlorite lattice, follows:

$$(6-x)\ A^{2+}O \cdot x\ L_2^{3+}O_3 \cdot (4-x)\ SiO_2 \cdot (4-y)\ H_2O,\ y\ HF \qquad [2]$$

wherein:
A is Ni, Mg, Co, $Fe^{2+}$, $Cu^{2+}$, $Mn^{2+}$, Zn, or mixtures thereof:
L is Al, Cr, $Fe^{3+}$, or mixtures thereof:;
$0 \leq x \leq 2$
$0 \leq y \leq 1$
$x + y \geq 0.1$
$0 \leq Co \leq 5.75$
$0 \leq Fe^{2+} \leq 5.25$
$0 \leq Zn \leq 4$
$4 \leq (Ni + Mg + Co + Fe^{2+} + Cu + Mn + Zn) \leq 6$
$Cu \leq 0.5$
$Mn \leq 0.5$
$(Cr + Ni + Co + Cu + Mn) > 0.1$
$Fe^{3+} \leq 1$ The foregoing formulation shows the kinds and quantities of the elements present within the lattice of the synthetic mineral, being a septechlorite, i.e., a 1:1 trioctahedral phyllosilicate having equal degrees of trivalent ion substitution in both octahedral and tetrahedral layers, and thus having a charge-balanced framework with no exchangeable ions needed for neutrality.

The inventive septechlorite catalyst precursors are made by hydrothermal synthesis, which, as is well known, involves reaction of the reactants in the presence of water at elevated temperatures.

The unit cell structure of the precursor septechlorites as indicated by powder x-ray diffraction methods is dependent on both synthesis conditions and composition. For short reaction times and/or low synthesis temperatures little hkl order is displayed in the x-ray pattern. The presence of the inventive 1:1 phase in these cases is none the less clearly shown by strong first and second order basal lines indicative of a d(001) spacing of approximately 7 Angstroms and the appearance of hk bands typical of trioctahedral layer silicates. For $x$ greater than about 0.2 and longer reaction times and/or higher synthesis temperature, the development of hkl lines characteristic of hexagonal symmetry are displayed in the diffraction patterns. As the examples to be presented later will show, one, two, three and six 1:1 layer polytypes may form. The compositional formulation [2] given above corresponds to the unit cell content of the one-layer polytype.

Little or no development of hkl order is seen in preparations having $x$ less than about 0.2. In these cases, while strictly speaking no three dimensional unit cell exists, for comparative purposes $a$ and $c$ unit all parameters may be calculated from the basal lines and the strong hk band at about 1.5 Angstroms corresponding to the orthohexagonal 06 layer silicate line.

We give now general procedures for making any desired septechlorite precursor within the scope of the invention. In general, relatively simple sources of the various elements present in the desired product are added to water and an alkali such as sodium hydroxide. The well-homogenized mixture is placed in a sealed pressure vessel, which is then brought to a preselected temperature and maintained there for a preselected period of time, after which the vessel is cooled and the contents removed, and, if desired or necessary, washed free of soluble salts and dried. Agitation during the hydrothermal processing is generally desired in large-scale preparations.

A general feed formula utilizing soluble salts is as follows: $(6-x)A^{+2}Cl_2 \cdot 2xL^{+3}Cl_3 \cdot (4-x)SiO_2 \cdot (12+4x+\beta) \cdot NaOH \cdot nH_2O$ where $\beta$ is the mols of base in excess of that necessary to precipitate all multivalent metals as their oxides or hydroxides, and where $n$ is approximately 200–350, preferably about 250. [3]

It will be appreciated that in the above feed formula, A represents the divalent metal or assortment of divalent metals desired, while L represents the trivalent metal or assortment of trivalent metals desired. The relative proportions of A and L as well as the parameter $x$ on which they depend are the same as those set forth in the oxide type formulation given earlier in this disclosure; we have found that the septechlorite products exhibit substantially the same ratio of metal constituents as is present in the feed mixture, so that the value of $x$ is the same for both feed and product. A may be any of the divalent metals recited earlier; while L may be any of the trivalent metals similarly listed earlier. The several constraints set forth as part of the oxide type formulation should, of course, be observed in preparing the feed. For the NaOH there may be substituted KOH, LiOH, $NH_4OH$, $1/2\ Ca(OH)_2$, or mixtures thereof, or like alkalizing agent.

The foregoing feed formula shows the various metals added as their chloride salts. This is in general preferred, although other salts may be used, such as the citrate, acetate, nitrate, and the like.

As the examples will show, $\beta$ in formula [3] above may vary from zero to as high as about 20, the higher values of $\beta$ being practical for weak bases such as $NH_4OH$. For strong bases a $\beta$ value higher than 6 is scarcely needed.

The constituents, save for the caustic and a minor portion of the added water, are conveniently placed in a suitable mixing device and homogenized, after which the caustic is added in solution with continued mixing. For small-scale laboratory runs, a silver-lined stainless steel pressure vessel with a capacity of about 15 ml may be used, and heated in an oven. For batches of larger size, autoclaves of suitable capacity may be used.

The feed formula just given does not recite fluoride, which, or course, is present whenever the preselected value of $y$ in the oxide formula is greater than 0. When this is the case, we find it best to add fluoride as sodium fluoride to the feed mixture without attempting to reduce the amount of caustic to compensate. Indeed, quite in contrast to the metallic ions, not all of the fluoride ions present in the feed mixture ultimately become part of the septechlorite lattice, so that it is necessary to use a considerable excess of sodium fluoride. Up to six or eight mols of sodium fluoride per formula weight in the feed may be used, which will still result in somewhat less than one mol of fluoride becoming part of the lattice; that is, $y$ in the oxide formula will be somewhat less than unity.

Consideration of the formulas for the feed and for the septechlorite product will make it evident that soluble salts, for the most part sodium chloride, will appear as an admixture with the product when this type of feed mixture is used. For most uses to which the precursor may be put it is desirable to separate out the soluble salts by thorough washing with water. The washed product may then be dried, and, if desired, ground.

The silica may be added in any convenient form, such as polysilicic acid, which may be made in accordance with U.S. Pat. No. 3,649,556 to Hoffman. Alternatively, sodium silicate solution may be used, taking into account the caustic soda equivalent thereof. The alumina is conveniently any finely-divided reactive form thereof, such as aluminum hydroxide, sometimes termed alumina trihydrate.

EXAMPLE 1

In order to show both the preparation of the inventive precursors and their utilization as catalysts, a number of examples will now be given. In the preparation of the precursors, which were all nickel aluminum septechlorites, the following feed formulation applied:

$(6-x)NiCl_2 \cdot 2xAlCl_3 \cdot (4-x)SiO_2 \cdot (12+4x)$ NaOH

The components shown above, the silica being in the form of polysilicic acid, were mixed in the proportion shown in the following tabulation, with 250 mols of water per formula weight, placed in a laboratory size pressure vessel, and reacted at a temperature of 350°C. and for the time of 6 hours.

The surface areas of the synthesized precursors were determined by the Brunauer-Emmett-Teller method, and are shown in square meters per gram in the table.

These precursors were then calcined at 540°C. under reducing conditions for four hours, and then tested for ethylbenzene hydrocracking activity at a flow rate of 1 cc per second with 0.1 gram of the inventive catalyst. Results follow:

| Run | x | Surface Area* | Ethylbenzene Hydrocracking Percent Conversion 1 hour | 10 hours | 10 hour selectivity** |
|---|---|---|---|---|---|
| 1-A | ½ | 162.4 | 60.6 | 47.2 | 0.12 |
| 1-B | 1 | 130.5 | 38.6 | 27.2 | 0.13 |
| 1-C | 1½ | 87.1 | 39.0 | 19.5 | 0.10 |
| 1-D | 2 | 69.0 | 29.4 | 9.5 | — |

*Precursor before calcining.
**Benzene/toluene in product.

The product of Run B, calcined in air to an amorphous catalyst at a temperature of 540°C., was also tested for cumene cracking activity. At a temperature of 350°C., the percent conversion was 31.8%.

A number of further examples will now be given, following the general plan of the examples just given, but illustrating various metal ions, various reaction conditions, and the like.

Example 2

Feed: 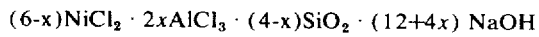

| Run | T°C | t(hr) | x | β | pH-f | pH-p | $^a$(A) | $^r$(A) |
|---|---|---|---|---|---|---|---|---|
| 2-A | 350 | 24 | 0.1 | 2 | 13.4 | 13.1 | 5.30 | 7.29 |
| 2-B | 350 | 48 | 1/2 | 0 | 6.8 | 4.8 | 5.304 | 7.233×1(d) |
| 2-C | 350 | 2 | 1 | 0 | 8.1 | 4.6 | 5.283 | 7.22×1(D) |
| 2-D | 350 | 6 | 1 | 0 | 8.1 | 5.0 | 5.287 | 7.17×1(D) |
| 2-E | 250 | 48 | 1 | 0 | 10.9 | 8.1 | 5.300 | 7.24×1(D) |
| 2-F | 250 | 96 | 1 | 1 | 11.7 | 12.5 | 5.303 | 7.17×1(D) |
| 2-G | 300 | 48 | 1 | 2 | 12.3 | 13.1 | 5.306 | 7.134×1(d) |
| 2-H | 350 | 48 | 3/2 | 0 | 7.9 | 2.6 | 5.280 | 7.058×3 |
| 2-I | 350 | 48 | 2 | 1 | 11.3 | 11.3 | 5.266 | 7.075×1(D) |
| 2-J | 350 | 48 | 2 | 4 | 12.9 | 13.3 | 5.285 | 7.10×1(D) |

Example 3

Feed: $(6-x)MgCl_2 \cdot 2xAlCl_3 \cdot (4-x)SiO_2 \cdot (12+4x+\beta)NaOH \cdot 250\ H_2O$

| Run | T°C | t(hr) | x | β | pH-f | pH-p | $^a$(A) | $^r$(A) |
|---|---|---|---|---|---|---|---|---|
| 3-A | 350 | 24 | 1/2 | 0 | 9.7 | 6.1 | 5.332 | 7.241×1(D) |
| 3-B | 350 | 24 | 1 | 0 | 9.7 | 6.7 | 5.324 | 7.144×1(d) |
| 3-C | 350 | 48 | 3/2 | 1 | 9.9 | 7.4 | 5.308 | 7.119×6(d) |
| 3-D | 350 | 48 | 2 | 2 | 11.4 | 10.9 | 5.284 | 7.168×1(D) |

Example 4

Feed: $(6-x)CoCl_2 \cdot 2xAlCl_3 \cdot (4-x)SiO_2 \cdot (12+4x+\beta)NaOH \cdot 250\ H_2O$

| Run | T°C | t(hr) | x | β | pH-f | pH-p | $^a$(A) | $^r$(A) |
|---|---|---|---|---|---|---|---|---|
| 4-A | 350 | 26 | 1 | 0 | 6.7 | 5.4 | 5.352 | 7.16×1(D) |
| 4-B | 350 | 48 | 1 | 1 | 10.6 | 6.2 | 5.358 | 7.151×1(D) |
| 4-C | 350 | 48 | 2 | 2 | 12.3 | 12.7 | 5.335 | 7.040×2 |

Example 5

Feed: $(6-x)FeCl_2 \cdot 2xAlCl_3 \cdot (4-x)SiO_2 \cdot (12+4x+\beta)NaOH \cdot 250\ H_2O$

| Run | T°C | t(hr) | x | β | pH-f | pH-p | $^a$(A) | $^r$(A) |
|---|---|---|---|---|---|---|---|---|
| 5-A | 350 | 24 | 3/2 | 0 | 9.7 | 5.7 | 5.386 | 7.05×1(D) |
| 5-B | 350 | 48 | 2 | 0 | 9.4 | 4.9 | 5.399 | 7.04×1(D) |

Example 6

Feed:
$(6-x)MCl_2 \cdot 2xCrCl_3 \cdot (4-x)SiO_2 \cdot (12+4x+\beta)NaOH \cdot 250\ H_2O$
All runs: 350°C., 48 hours.

| Run | M | x | β | pH-f | pH-p | $^a$(A) | $^r$(A) |
|---|---|---|---|---|---|---|---|
| 6-A | Ni | ½ | 0 | 10.3 | 9.3 | 5.308 | 7.191×1(d) |
| 6-B | Ni | 1 | 0 | 10.3 | 8.9 | 5.308 | 7.158×1(d) |
| 6-C | Mg | 1 | 2 | 11.9 | 12.6 | 5.349 | 7.242×3(d) |
| 6-D | Mg | 1 | 4 | 12.9 | 13.3 | 5.360 | 7.215×3 |
| 6-E | Co | ½ | 1 | 12.9 | 13.7 | 5.397 | 7.218×1 |

Example 6-continued

Feed:
$(6-x)MCl_2 \cdot 2xCrCl_3 \cdot (4-x)SiO_2 \cdot (12+4x+\beta)NaOH \cdot 250\ H_2O$
All runs: 350° C., 48 hours.

| Run | M | x | β | pH-f | pH-p | $a$(A) | $c$(A) |
|-----|----|---|---|------|------|--------|--------|
| 6-F | Co | 1 | 2 | 13.0 | 13.4 | 5.390 | 7.171×1 |
| 6-G | Co | 1 | 3 | 12.9 | 13.5 | 5.391 | 7.188×1 |

Example 7

Feed:
$NiCl_2 \cdot 2AlCl_3 \cdot 3SiO_2 \cdot (16-d)NaOH \cdot eNaF \cdot 250\ H_2O$
All runs: 350° C., 48 hours.

| Run | d | e | pH-f | pH-p | $a$(A) | $c$(A) |
|-----|---|---|------|------|--------|--------|
| 7-A | 2 | 2 | 6.4  | 3.9  | 5.298 | 7.135×1(D) |
| 7-B | 0 | 1 | 11.4 | 9.3  | 5.302 | 7.142×1(d) |
| 7-C | 0 | 2 | 11.5 | 11.2 | 5.304 | 7.135×1(d) |
| 7-D | 0 | 4 | 11.5 | 12.3 | 5.307 | 7.139×1 |
| 7-E | 0 | 6 | 11.7 | 12.5 | 5.307 | 7.135×1 |

In the foregoing tabulations for Examples 2–5, the first column shows the run designation, the second column the reaction temperature, the third the reaction time in hours, the fourth and fifth, $x$ and $\beta$ respectively in the feed formulation given for each example, and the sixth and seventh the pH of the feed and of the product. The eighth and ninth columns give respectively the unit cell $a$ and $c$ hexagonal parameters in Angstrom units (A), as determined by x-ray diffraction. In all of the runs in Examples 2–7, an inventive precursor septechlorite was formed. The last figure, such as 1 or 3, appended to the $c$ dimension in the final column gives the number of layers in the repeat distance, the septechlorites as formed in accordance with the invention being prone to forming polytypes of this nature. This figure, when multiplied by the $c$ parameter shown, thus indicates the maximum cell height which is necessary to index all of the reasonably well-defined diffraction lines. In samples having small but noticeable amounts of $a,b$ disorder the notation "$(d)$" follows the multiplier just described; where strong disorder is present, "$(D)$" is used. If no hkl order is evident, the multiplier has been omitted. Typical diffraction patterns for selected runs are given in Tables 1–5 hereinbelow.

In Examples 2–5 and 7, the divalent metal ion was as shown in the feed formulation, and the trivalent metal ion was aluminum. In Example 6, the divalent metal ion was as shown in the tabulation, and the trivalent metal ion was chromium. In Example 7, fluoride ion was included in the feed formulation, and occupied lattice positions in the resulting inventive precursor septechlorite.

It will be evident from the general statement of the nature of the inventive precursor septechlorites and the structural formulas given therefore that more than one species of divalent metal ion and more than one species of trivalent metal ion may be present in a single precursor lattice. In Examples 1–7 above, only one species of each was present in a given run. Obviously the number of combinations and permutations as well as relative proportions of multiple species of metal ions is very large indeed, so that specific examples of all of the inventive precursors could hardly be given here. By way of illustrating this aspect of the invention, however, several examples will now be given.

Examples 8 and 9

Feed: $[5/n\ M^{2+}Cl_2 \cdot M^{3+}Cl_3][3SiO_2 \cdot M^{3+}Cl_3]\ (16+\beta)NaOH \cdot 250\ H_2O$
All runs at 350° C., 48 hours, except * 24 hours.

Example 8

| Run | n | $M^{2+}$ | $M^{3+}$ | β | pH-f | pH-p | $a$(A) | $c$(A) |
|-----|---|----------|----------|---|------|------|--------|--------|
| 8A* | 2 | Ni, Mg | Al | 0 | 11.1 | 9.5  | 5.30  | 7.34 |
| 8-B | 2 | Ni, Mg | Al | 0 | 9.3  | 5.7  | 5.307 | 7.160×1(D) |
| 8-C | 2 | Ni, Mg | Al | 2 | 12.3 | 11.7 | 5.327 | 7.211×1 |
| 8-D | 2 | Ni, Mg | Cr | 0 | 10.1 | 7.7  | 5.309 | 7.232×1(D) |
| 8-E | 2 | Ni, Mg | Cr | 2 | 11.9 | 12.4 | 5.328 | 7.157×3 |
| 8-F | 2 | Ni, Co | Cr | 0 | 10.7 | 8.5  | 5.338 | 7.161×1(d) |
| 8-G | 2 | Ni, Co | Cr | 2 | 11.9 | 12.4 | 5.341 | 7.132×1 |
| 8-H | 2 | Co, Mg | Al | 0 | 10.4 | 5.5  | 5.33  | 7.166×1(D) |
| 8-I | 2 | Co, Mg | Cr | 2 | 12.3 | 12.5 | 5.368 | 7.240×1 |

Example 9

| Run | n | $M^{2+}$ | $M^{3+}$ | β | pH-f | pH-p | $a$(A) | $c$(A) |
|-----|---|----------|----------|---|------|------|--------|--------|
| 9-A | 3 | Ni,Mg,Co | Al | 0 | 9.9  | 5.8  | 5.318 | 7.128×1(d) |
| 9-B | 3 | Ni,Mg,Co | Al | 2 | 12.3 | 12.1 | 5.330 | 7.183×1 |
| 9-C | 3 | Ni,Mg,Co | Cr | 2 | 12.1 | 12.5 | 5.347 | 7.188×1 |
| 9-D | 3 | Ni,Mg,Zn | Al | 0 | 9.7  | 6.5  | 5.317 | 7.126×2 |

Example 10

Feed: $(6-x)MgCl_2 \cdot x\ AlCl_3 \cdot x\ CrCl_3 \cdot (4-x)SiO_2 \cdot (12+4x+\beta)\ NaOH \cdot 250\ H_2O$
All runs at 350°C., 48 hours.

| Run  | x   | β | $M^{2+}$ | $M^{3+}$ | pH-f | pH-p | $a$(A) | $c$(A) |
|------|-----|---|----------|----------|------|------|--------|--------|
| 10-A | 0.5 | 0 | Mg | Al,Cr | 9.5  | 7.1  | 5.35  | 7.32 |
| 10-B | 1.0 | 2 | Mg | Al,Cr | 11.5 | 9.5  | 5.350 | 7.224×1(d) |
| 10-C | 1.5 | 2 | Mg | Al,Cr | 11.2 | 11.3 | 5.273 | 7.226×1(D) |

In Examples 8 and 9, the several divalent metal ions shown were present in equimolar proportions, as indicated by the feed formula. Of course, any relative proportions within the general structural formula may be used. In Example 10, the trivalent metal ions Al and Cr shown were present in equimolar quantities. Again, any relative proportions within the general structural formula may be used.

In the general feed formulations given earlier, the caustic shown and used was sodium hydroxide, for convenience. Other alkali metal or ammonium hydroxides or calcium hydroxide may be substituted, since the particular cation for this component is not critical, and indeed may be termed in general as any strong base. In Example 11 which follows, several hydroxides other than sodium are shown, all of which gave well-formed septechlorite precursors in accordance with the invention.

Example 11

Feed: $[(6-x)NiCl_2 \cdot xAlCl_3][(4-x)SiO_2 \cdot xAlCl_3] \cdot (12+4x+\beta)M^+OH \cdot 250H_2O$
All runs: 350° C., 48 hours, except * 24 hours.

| Run | x | β | M+ | pH-f | pH-p | a(A) | c(A) |
|---|---|---|---|---|---|---|---|
| 11-A | 1 | 0 | K | 6.1 | 3.7 | 5.280 | 7.2 |
| 11-B | 1 | 3 | K | 10.5 | 6.0 | 5.300 | 7.169(D) |
| 11-C | 1 | 0 | Li | 7.1 | 4.2 | 5.280 | 7.2 |
| 11-D | 1 | 3 | Li | 11.6 | 11.7 | 5.300 | 7.16 |
| 11-E | 2 | 19.7 | NH$_4$ | 9.8 | 9.7 | 5.266 | 7.11 |
| 11-F* | 1 | 0 | 1/2Ca | 10.2 | 11.4 | 5.300 | 7.138×1 |

The inventive precursor septechlorites can likewise be readily made by using a feed mixture in which the various components are added in the form of their oxides, basic oxides, or carbonates, without added alkali as such. This obviates the necessity for washing the product free of soluble salts. Several examples illustrating this type of feed will now be given.

EXAMPLE 12

200 ml of distilled water were placed in a laboratory mixer, 148.4 grams of nickel carbonate (91.8 gm NiO) added, and the mixture sheared until well-dispersed. In a separate laboratory mixer, a suspension of 5% polysilicic acid in water and containing 45 grams of SiO$_2$ was placed, 39 grams of alumina trihydrate stirred in, and well-dispersed. With continued further stirring, the nickel carbonate slurry was added, and mixing continued for five minutes. Water was then added to a total volume of 2800 cc. This was then placed in an autoclave and heated for four hours at 300°C. The product was then removed, examined by x-ray diffraction and found to be a well-crystallized septechlorite. It had the following formula, in which x had the value of unity:

and thus:

$(Ni_5Al)(Si_3Al) O_{10} (OH)_8$.

It was then tested for catalytic activity for two different reactions, after calcination to convert the precursor to the catalyst form just as described in Example 1. For the hydrocracking of ethylbenzene, the following percent conversion and benzene/toluene selectivity values were obtained.

| Run | Percent Conversion | | Benzene/Toluene Selectivity | |
|---|---|---|---|---|
| | One Hour | 10 Hours | One Hour | 10 Hours |
| 12-A | 56.6 | 28.7 | 0.099 | 0.093 |

The cumene cracking activity was then determined, just as described in Example 1. The percent conversion was 26.7.

An example showing not only the oxide technique applied on a larger scale but also illustrating the production of a septechlorite precursor containing two species of divalent metal ions in the lattice, viz., nickel and magnesium, will now be given.

EXAMPLE 13

To three gallons of water in a mixing vessel there were added 792.5 gm nickel carbonate (61.9% NiO) and 539.6 gm calcined magnesite (87.8% MgO), which were dispersed well therein by agitation. In a separate mixer containing twelve liters of 5% polysilicic acid sol and thus 600 gm SiO$_2$, 936 gm of Al$_2$O$_3 \cdot$ 3H$_2$O (alumina trihydrate; aluminum hydroxide) were added with agitation. While stirring continued, the slurry of nickel carbonate/magnesium oxide was added, and mixed for an additional five minutes. The entire mixture was then placed in an autoclave and maintained at 300°C. for 4 hours.

The product was a well-crystallized precursor septechlorite, with an a spacing of 5.30 A and a c spacing of 7.17 A. The product had the following formula:

13-A:$(Ni_{1.56}Mg_{2.94}Al_{1.5})(Si_{2.5}Al_{1.5}) O_{10} (OH)_8$.

A similar procedure was used in the following preparations.

EXAMPLE 14

Alumina trihydrate (64.9% Al$_2$O$_3$), calcined magnesite (96.1% MgO) and nickel carbonate (50.5% NiO) were added to 5% polysilicic acid under high shear. Further mixing for approximately five minutes resulted in a homogeneous feed mixture which was then adjusted to a total volume of 2800 ml by addition of water. The feed was charged to a one gallon autoclave and maintained at 1240 psi (approximately 300°C.) for 4 hours.

| Run | gm SiO$_2$ | gm Al(OH)$_3$ | calcined gm magnesite | gm Ni carbonate |
|---|---|---|---|---|
| 14-A | 99.0 | 85.8 | 0 | 403.9 |
| 14-B | 109.2 | 95.2 | 50.7 | 267.7 |
| 14-C | 118.2 | 103.0 | 96.4 | 145.2 |

The above feed mixtures resulted in septechlorites having the following formula weight contents, unit cell parameters and base exchange capacities (ammonium acetate method):

| Run | Formula Weight Composition | $a$(A) | $c$(A) | Base Exchange Capacity |
|---|---|---|---|---|
| 14-A | $(Ni_5Al)(Si_3Al)O_{10}OH_8$ | 5.300 | 7.129×1(d) | 12.0 |
| 14-B | $(Ni_3Mg_2Al)(Si_3Al)$ | 5.31 | 7.18×1(D) | 18.4 |
| 14-C | $(Ni_{1.5}Mg_{3.5}Al)(Si_3Al)$ | 5.31 | 7.18 | 23.4 |

It will be noted that these base-exchange capacity values are of the same order of magnitude as for, e.g., kaolinite and attapulgite, and are consistent with an electrostatically balanced layer structure. (Units are milliequivalents per 100 grams).

A working example of a plant-scale run using an oxide/acetate type of feed mixture and in which the precursor septechlorite thus produced contained aluminum, nickel, and magnesium as the positive ions, will now be given.

EXAMPLE 15

434 gallons of polysilicic acid sol having 5.35% solids and a pH of 2.5 was pumped into a feed mix vessel, followed by 173 pounds of aluminum hydroxide, with the agitator in the vessel operating. A magnesite slurry having a solids content of 9.5% and containing 159 pounds of magnesia calculated as MgO was pumped in and the entire mixture agitated over a weekend. 517 pounds of Ni(acetate)$_2$·4H$_2$O were then added and mixed for an additional hour. At this point the completed feed mixture had a pH of 7.5. This was then pumped to the autoclave, which was lined with nickel-chromium alloy and had a capacity of 2,800 gallons. The feed mix vessel was chased with 820 gallons of water which were added to the suspension in the autoclave. The resulting slurry had a solids content of 11.17%. The temperature of the autoclave was brought up to 300°C. in 1 hour and 35 minutes. Samples were withdrawn at hourly intervals and the pH and density of each sample were run. After three hours and ten minutes at this temperature the synthesis was considered complete on the basis of crystallinity and density, so that the run was drawn off to a spray drier tank. After two hours shearing the product was then spray dried to 10% moisture. The product had a compacted bulk density of 60 pounds per cubic foot.

This example further illustrates the utilization of the components largely in their oxide form.

X-ray diffraction supplemented by chemical analysis showed a well-crystallized septechlorite having the following formula:

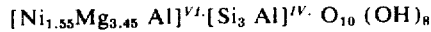

[$Ni_{1.55}Mg_{3.45}$ Al]$^{VI}$·[Si$_3$ Al]$^{IV}$· O$_{10}$ (OH)$_8$

EXAMPLE 16

This example illustrates the use of sodium silicate as the source of silica, and also the employment of pelletization of the solid reactants.

One hundred fifty-one grams hydrated alumina, 322 grams sodium silicate ("GD" brand, 54% SiO$_2$, 27% Na$_2$O, 18.5% H$_2$O) and 729 grams nickel carbonate (80.21% pure based on ignition to NiO) were blended together and then 400 grams water added with thorough mixing. This formed a pasty mass which was extruded to form ⅛-inch pellets, which were then oven-dried at about 120° C. The pellets were then loaded into a 1 gallon autoclave and enough water added to cover. The vessel was heated to 300° C. and maintained there for 3 hours, following which the vessel was cooled. While the pellets had fallen apart during the hydrothermal processing, the product was in the form of small granules, which readily permitted pouring off the reaction water. The granules were dried and ground, and when examined by x-ray diffraction were found to be a well-crystallized septechlorite, with an $a$ spacing of 5.298 A, and a $c$ spacing of 7.143x1 (D) A. This product had five nickel atoms per unit cell, so that $x$ in equation [2] was 1, and $y$ of course was 0, no fluoride having been used.

Bearing in mind that in feed formulation [3] the multivalent metals are precipitated as their oxides or hydroxides by the base, it will be clear that whether the feed additives are soluble salts such as chlorides as in Examples 1–10, or oxides, hydroxides, and carbonates as in Examples 12–14, the feed formulation as autoclaving is commenced will in general be represented by the following:

$$(6-x)A^{2+}R_2·2xL^{3+}R_3·(4-x)SiO_2·nH_2O·\beta M^+OH·\Psi CF^-$$

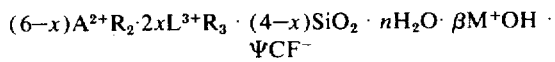

[4]

where:
R is ½ O$_2$, OH, ½ CO$_3$, or mixtures thereof;
M is Na$^+$, K$^+$, Li$^+$, NH$_4^+$ 1/2Ca$^{++}$, or mixtures thereof;
$\beta$ is from 0 to 20;
$\Psi$ is from 0 to 8;
where C is the counter-ion to F$^-$ and is selected from the group consisting of ½A$^{2+}$, ⅓B$^{3+}$, M$^+$, and mixtures thereof;
$n$ is from 25 to 2000; and
the other symbols and restraints are as set forth in Formula [2]

The feed mixture is heated under autoclave conditions at from about 250°C. to about 375°c. for a period of time long enough for the septechlorite precursor to form, which as shown in the examples is generally from a few hours to a few days.

As we have explained hereinabove, in order to form our inventive catalysts we calcine the septechlorite precursors so that they are amorphous when examined by x-ray diffraction. This terminology is well understood by those skilled in the art. One must, of course, understand that this by no means implies that the structure is utterly random. To the contrary, the relative dispositions of the component ions have been conditioned by their previous crystalline structure while in the precursor septechlorite state. However, in view of the number of different atomic species present, it is quite beyond present-day technology to determine precisely what those dispositions are, so that the inventive catalysts can only be characterized in terms of their crystalline precursors and of the processing by way of calcining.

It will be understood that by "amorpphous" we refer to the essential non-appearance of the characteristic septechlorite structure in the x-ray diffraction pattern, although diffuse metal oxide crystal patterns may appear, as for example bunsenite, i.e., nickel oxide.

In Tables 1–5 which follow, we give x-ray diffraction patterns for five typical septechlorite precursors, corresponding to runs already described. In particular, these illustrate a sample having little or no hkl order, as well as the 1, 2, 3 and 6-layer polytypes.

It should be noted that the line intensities of any particular septechlorite structure are dependent upon the x-ray scattering abilities of the atomic species present.

Table 1

Diffraction pattern showing no hkl order
Sample: Preparation of Example 8-A
Composition: $(Mg_{2.85}Ni_{2.95}Al_{0.1})(Si_{3.9}Al_{0.1})O_{10}(OH)_8$
Unit Cell Parameters:  a = 5.30 A
c = 7.34 A

| $d_{obs}$ | dcalc. | $h^2 + hk + k^2$ | l | $I_{obs}$ |
|---|---|---|---|---|
| 7.34* | 7.34 | — | 1 | 100 |
| 4.58 | 4.59 | 1 | — | 20 |
| 3.67* | 3.67 | — | 2 | 50 |
| 2.60 | 2.65 | 3 | — | 20 |
| 2.45 | 2.45 | — | 3 | 10 |
| 1.530* | 1.530 | 9 | — | 30 |

*Lines used in least squares fit.

Table 2

One-layer Polytype Diffraction Pattern
Sample: Preparation of Example 6-A
Composition: $(Ni_{5.5}Cr_{0.5})(Si_{3.5}Cr_{0.5})O_{10}(OH)_8$
Unit Cell Parameters:  a = 5.309 A
c = 7.191×1 A

| $d_{obs}$ | $d_{calc}$ | $h^2+hk+k^2$ | l | $I_{obs}$ |
|---|---|---|---|---|
| 7.190* | 7.191 | 0 | 1 | 100 |
| 4.599 | 4.598 | 1 | 0 | 5 |
| 3.603* | 3.595 | 0 | 2 | 40 |
| 2.654* | 2.654 | 3 | 0 | 15 |
| 2.490* | 2.490 | 3 | 1 | 50 |
| 2.135* | 2.135 | 3 | 2 | 25 |
| 1.778* | 1.779 | 3 | 3 | 10 |
| 1.533* | 1.533 | 9 | 0 | 22 |
| 1.499 | 1.499 | 9 | 1 | 20 |
| 1.486(sh) | 1.488 | 3 | 4 | 10 |

*Lines used in least sqs. fit

Table 3

Two-layer Polytype Diffraction Pattern
Sample: Preparation of Example 4-C
Composition: $(Co_4Al_2)(Si_2Al_2)O_{10}(OH)_8$
Unit Cell Parameters:  a = 5.335 A
c = 7.040×2 A

| $d_{obs}$ | $d_{calc}$ | $h^2+hk+k^2$ | l | $I_{obs}$ |
|---|---|---|---|---|
| 7.053* | 7.040 | 0 | 2 | 100 |
| 4.615* | 4.620 | 1 | 0 | 6 |
| 3.873* | 3.863 | 1 | 2 | 3 |
| 3.524* | 3.520 | 0 | 4 | 61 |
| 3.293 | 3.293 | 1 | 3 | 2 |
| 2.804 | 2.800 | 1 | 4 | 2 |
| 2.621* | 2.621 | 3 | 1 | 21 |
| 2.496* | 2.494 | 3 | 2 | 28 |
| 2.319* | 2.319 | 3 | 3 | 16 |
| 2.127* | 2.126 | 3 | 4 | 7 |
| 1.937* | 1.937 | 3 | 5 | 19 |
| 1.761* | 1.762 | 3 | 6 | 5 |
| 1.605 | 1.606 | 3 | 7 | 7 |
| 1.540* | 1.540 | 9 | 0 | 12 |
| 1.505 | 1.505 | 9 | 2 | 6 |
| 1.469 | 1.469 | 3 | 8 | 6 |

*Lines used in least sqs. fit

Table 4

Three-layer Polytype Diffraction Pattern
Sample: Preparation of Example 2-H
Composition: $(Ni_{4.5}Al_{1.5})(Si_{2.5}Al_{1.5})O_{10}(OH)_8$
Unit Cell Parameters:  a = 5.280 A
c = 7.058×3 A

| $d_{obs}$ | $d_{calc}$ | $h^2+hk+k^2$ | l | $I_{obs}$ |
|---|---|---|---|---|
| 7.064* | 7.058 | 0 | 3 | 100 |
| 4.575* | 4.572 | 1 | 0 | 14 |
| 4.477(sh) | 4.469 | 1 | 1 | 9 |
| 4.210 | 4.197 | 1 | 2 | 2 |
| 3.840* | 3.837 | 1 | 3 | 6 |
| 3.541* | 3.529 | 0 | 6 | 58 |
| 2.794 | 2.794 | 1 | 6 | 4 |
| 2.617 | 2.619 | 3 | 1 | 28 |
| 2.472* | 2.472 | 3 | 3 | 47 |
| 2.361 | 2.362 | 3 | 4 | 22 |
| 2.35(sh) | 2.353 | 0 | 9 | sh |
| 2.240 | 2.240 | 3 | 5 | 4 |
| 2.113* | 2.114 | 3 | 6 | 13 |
| 1.989 | 1.989 | 3 | 7 | 6 |
| 1.870 | 1.869 | 3 | 8 | 2 |
| 1.755* | 1.756 | 3 | 9 | 9 |
| 1.651 | 1.652 | 3 | 10 | 4 |
| 1.524* | 1.524 | 9 | 0 | 33 |
| 1.490* | 1.490 | 9 | 3 | 14 |
| 1.467 | 1.467 | 3 | 12 | 6 |

*Lines used in least sqs. fit

Table 5

Six-layer Polytype Diffraction Pattern
Sample: Preparation of Example 3-C
Composition: $(Mg_{4.5}Al_{1.5})(Si_{2.5}Al_{1.5})O_{10}(OH)_8$
Unit Cell Parameters:  a = 5.308 A
c = 7.119×6 A hkl line breadth indicates limited a,b, plane disorder

| $d_{obs}$ | $d_{calc}$ | $h^2+hk+k^2$ | l | $I_{obs}$ |
|---|---|---|---|---|
| 7.092* | 7.119 | 0 | 6 | 100 |
| 4.596* | 4.597 | 1 | 0 | 28 |
| 4.49(sh) | 4.494 | 1 | 2 | 16(sh) |
| 4.364 | 4.375 | 1 | 3 | 6 |
| 4.220 | 4.223 | 1 | 4 | 7 |
| 3.850 | 3.862 | 1 | 6 | 7 |
| 3.562* | 3.560 | 0 | 12 | 83 |
| 2.805 | 2.815 | 1 | 12 | 3 |
|  | 2.654 | 3 | 0 |  |
| 2.63 (broad) | 2.649 | 3 | 1 | 22 |
|  | 2.634 | 3 | 2 |  |
|  | 2.609 | 3 | 3 |  |
| 2.486* | 2.487 | 3 | 6 | 28 |
| 2.374 | 2.373 | 0 | 18 | 30 |
| 2.312 | 2.317 | 3 | 9 | 6 |
| 2.251 | 2.254 | 3 | 10 | 3 |
| 2.120 | 2.127 | 3 | 12 | 3 |
| 1.998 | 2.003 | 3 | 14 | 11 |
| 1.937 | 1.941 | 3 | 15 | 8 |
| 1.881 | 1.882 | 3 | 16 | 3 |
| 1.768 | 1.769 | 3 | 18 | 4 |
| 1.728 | 1.715 | 3 | 19 | 4 |
| 1.660 | 1.664 | 3 | 20 | 6 |
| 1.606 | 1.614 | 3 | 21 | 3 |
| 1.561 | 1.567 | 3 | 22 | 4 |
| 1.533* | 1.532 | 9 | 0 | 35 |
| 1.498 | 1.498 | 9 | 6 | 10 |
| 1.472 | 1.478 | 3 | 24 | 3 |

*Lines used in least sqs. fit

It will be understood that while we have explained the invention with the aid of specific examples, nevertheless considerable variation is possible in choice of raw materials, proportions, processing conditions, and the like, within the broad scope of the invention as set forth in the claims which follow.

Having described the invention, we claim:

1. A catalyst having hydrocarbon conversion activity consisting essentially of a calcined precursor synthetic septechlorite having a chemical composition represented by the following:

$(6-x) A^{2+}O \cdot x L_2^{3+}O_3 \cdot (4-x) SiO_2 \cdot y HF$ wherein:
A is Ni, Mg, Co, $Fe^{2+}$, $Cu^{2+}$, $Mn^{2+}$, Zn, or mixtures thereof:
L is Al, Cr, $Fe^{3+}$, or mixtures thereof:
$0 \leq x \leq 2$
$0 \leq y \leq 1$
$x + y \geq 0.1$
$0 \leq Co \leq 5.75$
$0 \leq Fe^{2+} \leq 2.25$
$0 \leq Zn \leq 4$
$4 \leq (Ni + Mg + Co + Fe^{2+} + Cu + Mn + Zn) \leq 6$
$Cu \leq 0.5$
$Mn \leq 0.5$
$(Cr + Ni + Co + Cu + Mn) > 0.1$
$Fe^{3+} \leq 1$, said precursor septechlorite prior to calcining being a 1:1 trioctahedral phyllosilicate having equal degrees of trivalent ion substitution in both octahedral and tetrahedral layers, and thus having a balanced framework with no exchangeable ions needed for neutrality.

2. The catalyst in accordance with claim 1 wherein said calcination has been carried out at a temperature of within about 500°C. to about 800°C., whereby said catalyst no longer displays the characteristic lines of a septechlorite upon x-ray diffraction.

3. The catalyst in accordance with claim 1 wherein A is nickel, L is aluminum, and $x$ has a value between about 0.1 and about 2.0.

4. The catalyst in accordance with claim 1 wherein A is nickel and magnesium, L is aluminum, and $x$ has a value between about 0.1 and about 2.0.

5. A catalyst-yielding synthetic precursor phyllosilicate consisting essentially of a septechlorite having the following chemical composition:

$(6-x) A^{2+}O \cdot x L_2^{3+}O_3 \cdot 4-x) SiO_2 \cdot (4-y) H_2O \cdot y HF$ wherein:
A is Ni, Mg, Co, $Fe^{2+}$, $Cu^{2+}$, $Mn^{2+}$, Zn, or mixtures thereof:
L is Al, Cr, $Fe^{3+}$, or mixtures thereof:
$0 \leq x \leq 2$
$0 \leq y \leq 1$
$x + y \geq 0.1$
$0 \leq Co \leq 5.75$
$0 \leq Fe^{2+} \leq 5.25$
$0 \leq Zn \leq 4$
$4 \leq (Ni + Mg + Co + Fe^{2+} + Cu + Mn + Zn) \leq 6$
$Cu \leq 0.5$
$Mn \leq 0.5$
$(Cr + Ni + Co + Cu + Mn) > 0.1$
$Fe^{3+} \leq 1$, said septechlorite being a 1:1 trioctahedral phyllosilicate having equal degrees of trivalent ion substitution in both octahedral and tetrahedral layers, and thus having a charge balanced framework with no exchangeable ions needed for neutrality.

6. The phyllosilicate in accordance with claim 5 wherein A is nickel, L is aluminum, and $x$ has a value between about 0.1 and about 2.0.

7. The phyllosilicate in accordance with claim 5 wherein A is nickel and magnesium, L is aluminum, and $x$ has a value between about 0.1 and about 2.0.

8. The process of forming a precursor septechlorite which consists of the steps of forming a reaction mixture by mixing together the following components:

$(6-x)A^{2+}R_2 \cdot 24 - L^{3+}R_3 \cdot (4x)SiO_2 \cdot n H_2O \cdot \beta M^+OH \cdot \Psi CF^-$ where:
R is ½ $O_2$, OH, ½ $CO_3$, or mixtures thereof;
$M^+$ is $Na^+$, $K^+$, $Li^+$, $NH_4^+$, 1/2 $Ca^{++}$ or mixtures thereof;
$\beta$ is from 0 to 20;
$\Psi$ is from 0 to 8;
where C is the counter-ion to $F^-$ and is selected from the group consisting of ½$A^{2+}$, ⅓$B^{3+}$, $m^+$, and mixtures thereof;
$n$ is from 25 to 2000;
A is Ni, Mg, Co, $Fe^{2+}$, $Cu^{2+}$, $Nm^{2+}$, Zn, or mixtures thereof:
L is Al, Cr, $Fe^{3+}$, or mixtures thereof;
$0 \leq x \leq 2$
$0 \leq Co \leq 5.75$
$0 \leq Fe^{2+} \leq 5.25$
$0 \leq Zn \leq 4$
$4 \leq (Ni + Mg + Co + Fe^{2+} + Cu + Mn) \leq 6$
$Cu \leq 0.5$
$Mn \leq 0.5$
$(Cr + Ni + Co + Cu + Mn) > 0.1$
$Fe^{3+} \leq 1$ and thereafter heating said reaction mixture under autoclave conditions at a temperature of from about 250°C. to about 375°C. until said septechlorite has been formed.

* * * * *

UNITED STATES PATENT OFFICE
CERTIFICATE OF CORRECTION

Patent No. 3,917,541  Dated November 4, 1975

Inventor(s) ALAN C. WRIGHT and HSIEN-DAO CHANG

It is certified that error appears in the above-identified patent and that said Letters Patent are hereby corrected as shown below:

Column 2, line 24, that portion of the formula 1 reading "[$M^{2+}_{6-x}$, $M^{3+}_x$]" should read --[$M^{2+}_{6-x}$, $M^{3+}_x$]--. Column 3, line 6, "cu2+" should read --$Cu^{2+}$--; column 3, line 8, "thereof:;" should read --thereof:--; column 3, line 35, "hkl" should read --$\underline{hkl}$--; column 3, line 39, "hk" should read --$\underline{hk}$--; column 3, line 42, "hkl" should read --$\underline{hkl}$--; column 3, line 49, "hkl" should read --$\underline{hkl}$--; column 3, line 52, "all" should read --cell--; column 3, line 54, "hk" should read --$\underline{hk}$--. Column 4, line 2, the portion of the formula 3 reading "$\overline{2xL}^{+3} Cl_3 \cdot (4-x)SiO_2$" should read --$2xL^{+3} Cl_3 \cdot (4-x)SiO_2$--. Column 6, Example 4, line 1, that portion of the formula reading "·12+4x+β)" should read --·(12+4x+β)--. Column 7, Example 7, line 2, that portion of the formula reading "$NiCl_2$" should read --$5NiCl_2$--. Column 8, line 8 "hkl" should read --$\underline{hkl}$--. Column 12, line 41, "[2]" should read --[2].--; column 12, line 43, "375°c" should read --375°C--. Column 13, line 2, "hkl" should read --$\underline{hkl}$--;

column 14, Table 5, line 37 and 38, "4.364    should read  --4.364
                                        4.220 "                4.220--

UNITED STATES PATENT OFFICE
CERTIFICATE OF CORRECTION

Patent No. 3,917,541　　　　　　　　Dated November 4, 1975

Inventor(s) ALAN C. WRIGHT and HSIEN-DAO CHANG

It is certified that error appears in the above-identified patent and that said Letters Patent are hereby corrected as shown below:

Column 15, Claim 1, line 1, the portion of the formula reading "$SiO_{2\,10}y$ HF" should read --$SiO_2 \cdot (4-y)H_2O \cdot y$ HF--; column 15, Claim 5, line 37, the portion of the formula reading "$\cdot 4-x)$" should read --$\cdot (4-x)$--. Column 16, Claim 5, line 3, that portion of the formula reading "O Mn)" should read --Mn)--; column 16, Claim 8, line 20, that portion of the formula reading "$24-L^{3+}R_3 \cdot (4x)$" should read --$2xL^{3+}R_3 \cdot (4-x)$--; column 16, Claim 8, line 32, that portion of the formula reading "$Cu^{2+}, Nm^{2+}$" should read --$Cu^{2+}, Mn^{2+}$--.

Signed and Sealed this twenty-sixth Day of July 1977

[SEAL]

Attest:

RUTH C. MASON　　　　　　　　　　C. MARSHALL DANN
*Attesting Officer*　　　　　　　*Commissioner of Patents and Trademarks*